350-96.1 SR

XR 3,612,888

SEARCH ROOM

United States

[11] 3,612,888

SUBSTITUTE FOR MISSING XR

[72] Inventor Gerald Boucher
Hudson, N.H.

[21] Appl. No. 743,792
[22] Filed July 10, 1968
[45] Patented Oct. 12, 1971
[73] Assignee Sanders Associates, Inc.
Nashua, N.H.

[54] INFORMATION MEDIA READING APPARATUS
16 Claims, 6 Drawing Figs.

[52] U.S. Cl. ........ 250/219 D, 250/227, 235/61.11
[51] Int. Cl. ........ G08c 9/06
[50] Field of Search ........ 250/219 Q, 219, 227, 222; 235/61–115

[56] References Cited

UNITED STATES PATENTS

| | | | |
|---|---|---|---|
| 3,328,589 | 6/1967 | Ferguson | 250/219 |
| 2,968,804 | 1/1961 | Buffington | 250/222 |
| 3,219,179 | 10/1965 | Claason | 250/227 |
| 3,042,806 | 7/1962 | Lubin | 235/61-115 |
| 3,131,291 | 4/1964 | French | 235/61-115 |
| 3,142,749 | 7/1964 | Larsen | 235/61-115 |
| 3,229,073 | 1/1966 | Macker et al. | 235/61-115 |
| 3,444,358 | 5/1969 | Malone | 250/219 |
| 3,046,540 | 7/1962 | Litz et al. | 250/213 X |
| 3,248,554 | 4/1966 | Chen | 250/227 |
| 3,255,357 | 6/1966 | Kapany et al. | 250/227 |

*Primary Examiner*—Walter Stolwein
*Attorney*—Louis Etlinger

ABSTRACT: Data indications arranged in rows and columns on a card or other information media are read by use of an arrangement of a plurality of light sources, fiber optic conductors, and light sensors. The light sources are energized to sequentially read one card row at a time activating a selected photocell through unmasked fiber optic conductors. The light sources and conductor ends are aligned such that an aperture in the card will be read as a continuous light beam by a photocell for that position. Means are also provided to insure that the card is properly inserted into the card chamber.

INVENTOR
GERALD BOUCHER
BY
ATTORNEY

INVENTOR.
GERALD BOUCHER.
BY
ATTORNEY

INFORMATION MEDIA READING APPARATUS

BACKGROUND OF THE INVENTION

1. Field of the Invention

The present invention relates generally to data reading apparatus and more particularly to means for reading data indicated by apertures or marks on an information medium. 2. Description of the Prior Art In the prior art, various means have been used to transmit unmasked light beams to photocells so as to read a record perforated with data indicating apertures. In one such device fiber optic conductors are arranged as one column, each conductor being a row in itself. The card or tape to be read is moved past the fiber optic conductor input apertures such that a light beam will energize photocells which are in line with the data indicating apertures. The light source is on at all times since the card or tape containing the apertures is moving. This type of reader is commonly used in applications where a long tape possibly punched with a computer program must be read into a digital device with extremely high speed.

A card reader device in the prior art which reads a card fixedly positioned contains one light source which is energized when the card is to be read. The entire card is illuminated at the same time, thereby necessitating the use of as many photocells as there are data apertures and thereby increasing the amount of gating and decoding circuitry necessary.

Another card reader which is basically mechanical in nature, uses electrical contact brushes that physically engage the card such that contact will be made where an aperture occurs. This type of reader tends to wear and mutilate the card after successive passages through the sensing means.

Another card reader which is part of the prior art, uses electromechanical shutters in combination with a light source, fiber optics and photocells. One photocell is used for each column of the card to be read. With the light source energized during the entire reading process, electromechanical shutters, placed between the fiber optic output apertures and the photocells are sequentially opened and closed until each column of the card is read.

It can be seen from the above that the following limitations have been associated with the prior art card readers either singly or in combination in that they necessitate: the need for moving the card or tape past the sensor means; the use of mechanical apparatus subjecting the reader to decreased life, reduced reliability, and also increased time needed to read a card, and the need for increased amounts of sensors and circuitry.

SUMMARY AND OBJECTS OF THE INVENTION

Accordingly, a primary object of this invention is to provide an improved card reader.

An additional object of the invention is to provide a compact card reader with no mechanical moving parts.

Another object of the invention is to provide a card reader in which the card to be read is stationary without the necessity for increased amounts of sensors and associated gating and decoding circuitry.

A still further object of the invention is to provide a card reader using electroluminescent panels as light sources, in combination with fiber optic conductors and light sensors such as photocells wherein said light sources are sequentially energized so as to read the data apertures of said card row by row, each row containing a plurality of columns.

Another object of the invention is to provide a record reading means wherein fiber optic conductors may be arranged so as to directly convert an input code to any output code.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the reading means of this invention comprises a light source assembly, a light directing enclosure, a photocell assembly and a means for sequentially reading rows of data indicating apertures on an information medium inserted in the record or card chamber. The chamber is disposed between the light source assembly and the light directing enclosure and is further formed by a record or card guide.

The light source assembly includes a plurality of electroluminescent panels in registration with each row of the fully inserted card. The light directing enclosure includes a matrix of apertures in registration with a fully inserted card, and also includes output apertures between which apertures are connected fiber optic conductors. The photocell assembly includes a plurality of photocells in registration with the output apertures of said enclosure. Also included for operation of the card reader is a means for sequentially energizing the rows of electroluminescent panels in order to read a row of data at a time as indicated on the card.

In operation, after a card is inserted into the card chamber, the card reading operation is enabled by means of an arrangement indicating full insertion of the card. Each row of the card is illuminated one at a time by its respective light panel. A light path is established wherever a data indicating aperture appears on said card which light is received at an input aperture of the light directing enclosure. The light is then channelled to and read by means of a photocell. This operation is repeated in sequence for each row until the card is completely read. The data indications could be opaque marks on a translucent or transparent background. In such case, data would be indicated by the absence of light.

Thus it can be seen that a card reader is shown which uses no mechanical moving parts and minimizes sensors, circuits and decoding means through the use of a sequential switching scheme wherein each row of data is read one at a time, each row containing a plurality of columns. Also the means described adapts to a very compact and efficient card reader.

BRIEF DESCRIPTION OF THE DRAWINGS

The foregoing and other objects, features and advantages of the invention will be apparent from the following, more particular description of preferred embodiment of the invention, as illustrated in the accompanying drawings.

In the Drawings.

Figures 1, 2, 3:
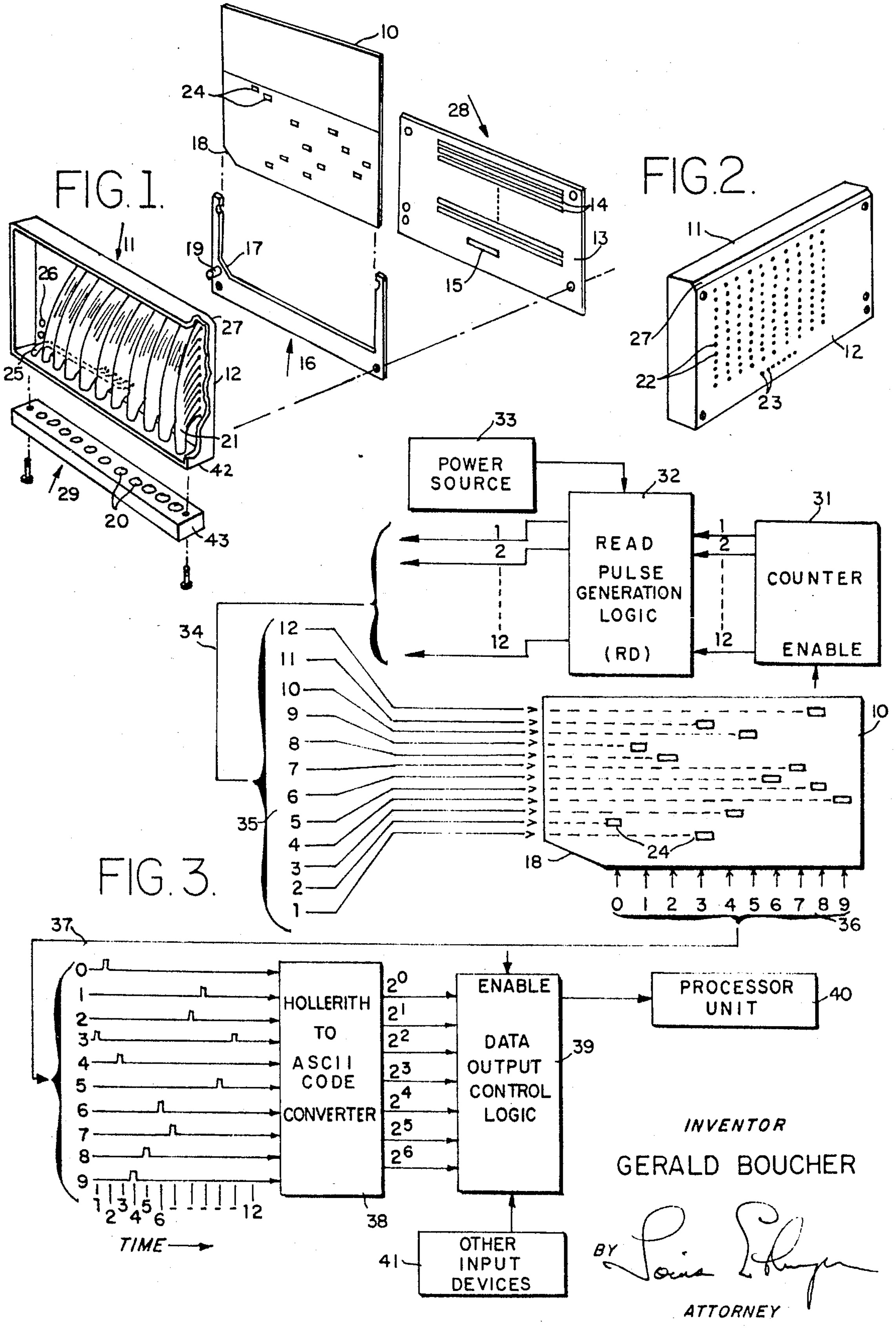
FIG. 1 is an exploded perspective view of the card reader and illustrates the insertion position of the card to be read.
FIG. 2 is a perspective view of the light directing enclosure input aperture side.
FIG. 3 is a schematic diagram of the system used to sequence the reading of and the decoding of the card.

Now referring to FIG. 1, there is illustrated an exploded perspective view of the card reader comprising a light source assembly 28, a card guide 16, a light directing enclosure 11, and a photocell assembly 29. The information medium such as a record or card 10 is shown in a position ready for insertion into the card chamber. The data indications are shown as apertures 24 on card 10 and are arranged in rows and columns. Data indications could as well have been opaque marks on a translucent or transparent background. In the particular card shown, and as more clearly shown in FIG. 3, the card 10 includes 12 rows and 10 columns. However, this number is by example only, for the card 10 and card reader might have included any number of rows and columns. The card 10, as shown, is coded for decimals in a Hollerith code. However, the Hollerith code could have been used for letters or special symbols in addition to numbers. The light source assembly 28 includes electroluminescent (EL) panels 14 arranged in substantially parallel and horizontal rows integral to a nonconducting board 13. The EL panels correspond in number to the rows of card 10, such that when the card 10 is fully inserted into the card chamber, the EL panels arranged in rows on the board 13 are in registration with the respective rows of card 10. Also integral to board 13 of the light source assembly 28 is an EL panel 15, which is shorter than EL panels 14. The EL panel 15, in combination with detection means, enables the card reader only when the card 10 is fully inserted into the card chamber. The EL panel and detection means arrangement is located at the lowermost position of the card chamber. Positive indication of full insertion will be made if the resulting light beam is interrupted by the card 10.

The light directing enclosure 11 includes a plurality of fiber optic conductors 21 arranged in a row and column configuration. The fiber optic conductor rows are in alignment with the EL panel rows. Each row comprises one bundle of fiber optic conductors for each column. More than one fiber optic conductor may comprise a light path. One fiber optic conductor 21 is bonded to each input aperture 22 whereas conductors 21 contained in each vertical column are bonded together to one output aperture 42.

In addition, the light directing enclosure 11 houses fiber optic conductors 25 which receive a light beam at their input apertures 23 from the EL panel 15 when a card 10 is not inserted in the card chamber. The conductors 25 are directed and bonded to an additional output aperture 42 which is utilized with a photocell 20 to detect the light beam. As explained above, this light beam will be interrupted and enable the card reader when the card 10 is fully inserted into the card chamber.

For ease of insertion of card 10 into the card chamber, light directing enclosure 11 has a chamber 27 cut into its card insertion end. In addition, for alignment purposes, the enclosure 11 contains a key slot 26 for the key pin 19 of card guide 16.

The photocell assembly 29 comprises the mounting block 43 and a plurality of photocells 20 mounted therein. The mounting block 43 attaches directly to the output aperture surface of the light directing enclosure 11. These photocells 20 are in registration with the output apertures 42 of the light directing enclosure 11. The output leads of the photocells 20 are connected to data handling apparatus to be described later.

Disposed between the light source assembly 28 and the light directing enclosure 11 and directly attached thereto is the card guide 16. This arrangement forms a card chamber for card 10. The width of the chamber is only slightly greater than the width of the card 10 such that undesirable light paths are virtually eliminated. As previously mentioned, the card guide 16 includes a key pin 19 which with key slot 26 insures proper alignment between the enclosure 11 and the light source assembly 28. One corner of the card guide 16 is filled with a member 17, so as to insure that the card 10 is properly oriented in the card chamber before the card reader is enabled. The registration cut 18 on card 10, in combination with the member 17 makes it impossible to insert the card 10 in the card chamber either backwards or upside down and still interrupt the light beam generated by EL panel 15.

Referring now to FIG. 2, the light directing enclosure input aperture surface 12 is illustrated, it not being visible in FIG. 1. The input aperture holes 22 are arranged in 12 horizontal rows and 10 vertical columns, although these numbers could be changed for various systems. This row and column configuration corresponds with that of card 10. Also included are the fiber optic input apertures 23 which are in registration with the EL panel 15 so as to detect whether the card 10 is fully inserted into the card chamber.

The card 10, as best shown in FIG. 3, and as previously explained, contains data indicating apertures represented by a single rectangular hole, or round hole, punched in a specific location on the card 10. The card 10, as shown for example, is divided into 12 horizontal rows and 10 vertical columns. Each column will represent numeral 0 through 9. For example, if the first row representing the first digit is punched in position 3, the first digit would be 3. Likewise, if the second row representing the second digit is punched in position O, the second digit will be O. It can therefore be readily seen that card 10 illustrated in FIG. 3 indicates the number 304, 986, 721, 538.

FIG. 3 also illustrates the electronics used to sequentially energize the EL panels 14 and the data handling apparatus. The counter 31 is a type well known in the art whereby after being enabled, it sequentially presents signals on its output lines after which it stops and resets itself. The counter 31 activates the read pulse generation logic 32 which logic comprises gates or electronic switches. When a switch is enabled, the power source 33 illuminates the respective EL panel 14. The light path generated by the EL panels 14 is schematically represented by a signal flow line 34. The light path then continues through apertures in a card 10 along the schematically represented photocell signal flow line 37 until the light activates photocells 20.

The data handling apparatus comprises a code converter 38, typically a read-only memory, and a processor unit 40 such as a computer. Data output control logic 39 which may be a multiplexer of some type is used when the contents of more than one input device is to be transferred to the processor unit 40.

In operation, when the card 10 is fully inserted into the card chamber, a light path between EL panel 15 and fiber optic conductors 25 is interrupted so as to enable the system. If desired, the system may be arranged so that this interrupted light path will either automatically start the system reading the card or allow the card reading operation to begin only after the operator engages another switch. When the system is enabled, the counter 31 will be sequentially turned on so as to activate successive rows of EL panels 14. When the first position of counter 31 is on, a first switch contained in the read pulse generation logic 32 will be turned on so as to energize the first of the EL panels 14 by means of power source 33. This operation will continue until all 12 rows of EL panels 14 are energized.

Referring now back to the energization of the first row of EL panels 14, a light path will be presented on the EL panel signal flow line 34, in registration with row 1 of card 10. Because the card 10 has a data indicating aperture 24 at column 3 of row 1, the light path of row 1 will continue on column 3 on the photocell signal flow line 37, activating the photocell 20 at column 3 so as to present a pulse at time $t=1$ to the code converter 38.

At time $t=2$, the second row of EL panels 14 will be energized; i.e., position 2 of counter 31 will be on, thereby enabling a second switch of the read pulse generation logic 32 such that the power source 33 will energize the second EL panel 14. This light will travel over a path to row 2 of card 10. The light will continue on column O of row 2 of the photocell signal flow line 37, because of the data indicating aperture 24 at that position. The photocell 20 of the column 0 will be activated so as to produce a pulse at time $t=2$.

This process will continue until all 12 rows are read and said information is sent to the code converter 38. This decimal information, as previously stated, will indicate, for the card 10 shown, the number 304, 986, 721, 538. Information from code converter 38 may be sent directly to the processor unit 40, or if other input devices 41 are also part of the system, these input devices 41 and a code converter 38 may be enabled one at a time to processor unit 40 by means of data output control logic 39.

Although the invention has been illustrated as reading information recorded by translucent or transparent indications on an opaque background, it is obvious that the invention is equally applicable to opaque data indications on a translucent or transparent background. In some cases, the card or record 10, instead of being an opaque card with apertures, might be photographic film or other translucent or transparent record with opaque spots as data indications. It would also be obvious that all apparatus would operate in substantially the manner as already described; i.e., data would be read as an absence of light. This technique of using opaque marks on a translucent or transparent data medium would be especially useful, for example, in hospitals, whereby patient data could be inserted on standardized forms by means of pencil marks which could be interpreted by commonly known means in combination with the record reading means disclosed herein.

Figures 4, 5, 6:
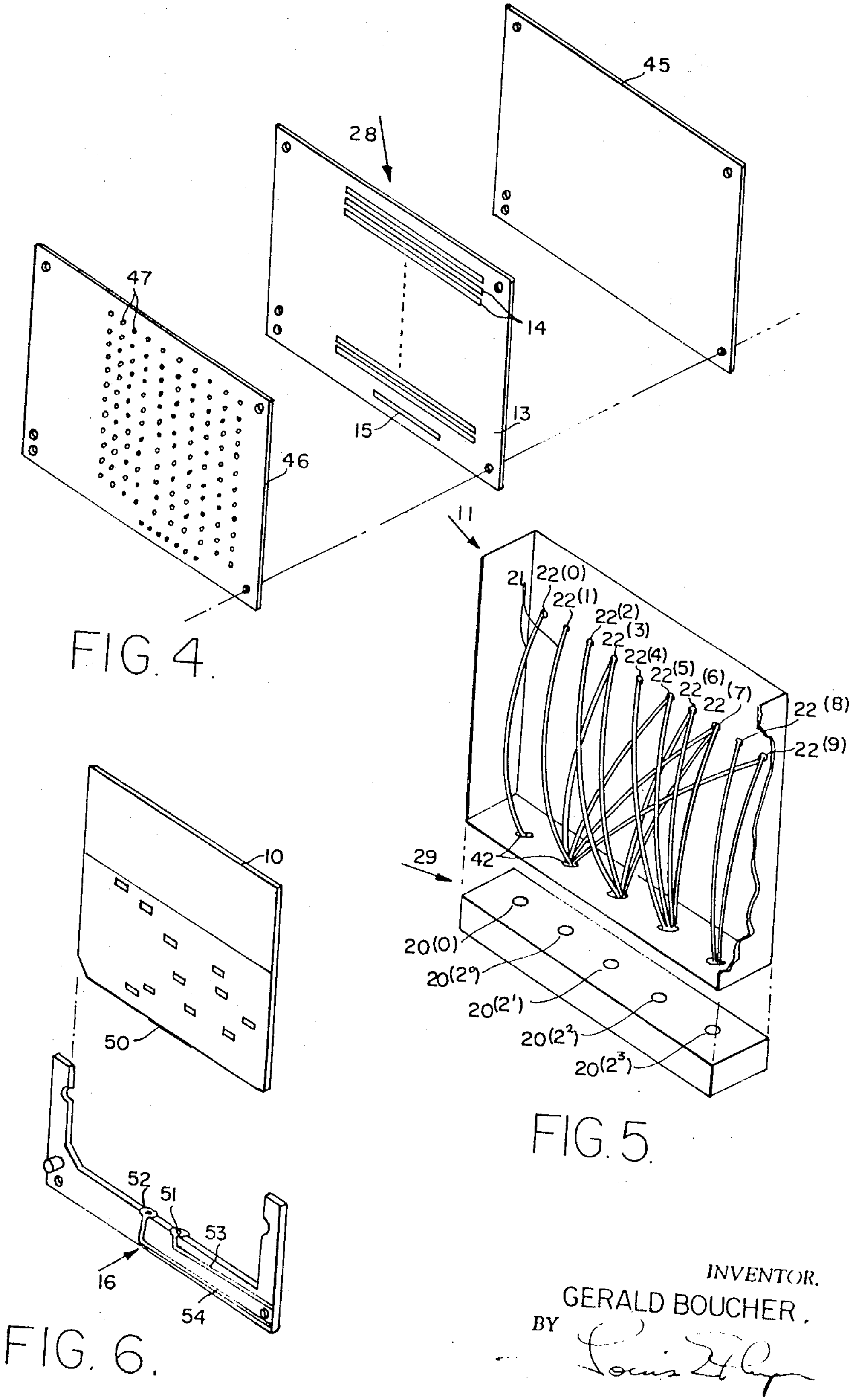
FIG. 4 is an exploded perspective view of the light source assembly with its associated ground planes.
FIG. 5 is a partly exploded perspective view of the light directing enclosure illustrating a means for direct code conversion.
FIG. 6 illustrates a switch means for insuring that the card to be read is properly positioned for reading.

If desired, the card reader may include the use of ground planes so as to reduce capacitance and noise in the system. As illustrated in FIG. 4, one ground plane 45 constructed for example, with a solid piece of copper, may be disposed on that side of the laminated board 13 of light source assembly 28 opposite the card guide 16. Another ground plane 46, constructed of copper and having apertures 47 at each possible data aperture location and in registration with the EL panels 14 and the input apertures 22 and 23 of the light directing enclosure 11 may be disposed on the side of board 13 adjacent card guide 16. Both of these ground planes may be directly bonded to the light source assembly 28. The second mentioned ground plane 46 will also be of advantage to the system in the reduction of stray light.

Another important feature of the system is the means for directly converting the code indicated by card 10 to ASCII or any other code. The fiber optic conductors 21 might be arranged so as to cross over from its column to another column. As shown in FIG. 1, the conductors 21 of a particular vertical column are all bonded together at one output aperture in alignment with a photocell 20. By rearranging these conductors, any output code such as decimal, binary, ASCII, or Hollerith could be generated from any input code and thus the code converter 38 could be eliminated.

For example, as illustrated in FIG. 5, a decimal code conversion to a binary code could be accomplished as follows. Note that FIG. 5 shows one row only, but that the other rows would be arranged in a similar manner. The photocells 20 could represent binary numbers 0, $2^0$, $2^1$, $2^2$ and $2^3$ thereby reducing the number of data reading photocells 20 required, from 10, as shown in FIG. 1, to 5, as shown in FIG. 5. The fiber optic conductor 21, indicative of 0, would be routed to the "0" photocell. The conductor 21, indicative of a 1, would be routed to the "$2^0$" photocell 20 ($2^0$). The conductor 21, indicative of a 2, would be routed to the "$2^1$" photocell 20 ($2^1$). The conductors 21, indicative of a 3, would be routed to the "$2^0$" and "$2^1$" photocells. This arrangement would continue in the same manner up to the digit 9. If the row energized allowed a light beam through an aperture 24 on card 10, indicative of the decimal 3, then at the time corresponding to that row, two pulses would be generated simultaneously at the outputs of photocells 20($2^0$) and 20($2^1$). Thus, the need for code converter 38 would be eliminated and direct code conversion would be performed in the enclosure 11. The means for insuring full insertion of the card 10 would remain unchanged.

By this technique, and by making enclosures 11 easily interchangeable any code conversion desired could be performed on the same card reader. By encapsulating the enclosure 11 with an epoxylike material, the fiber optic conductors 21 would have less chance of breaking their bond at either the input or output apertures.

An alternative means for insuring that the card 10 is fully inserted into the card chamber would be by means of a switch, fixedly secured at the innermost, most bottom position of the card chamber such that the card reader would not be enabled unless the card made contact with the switch. The switch could be the pressure type or could, more favorably, as illustrated in FIG. 6, be merely two contacts 51 and 52 which when in engagement could enable the circuits by appropriate connection to leads 53 and 54. A metallic strip at the bottom of the card 10 could be used to make engagement with the two contacts 51 and 52 when the card 10 is fully inserted in the card chamber.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described the invention, what is claimed as new and secured by Letters Patent is:

1. Apparatus for reading information stored on an information medium in the form of opaque and light transmissive areas arranged in a pattern according to a first code, said apparatus comprising;
 a plurality of light sources;
 a plurality of light sensing means;
 means for direct light from said light sources to said light sensing means to convert said information from said first code to a second code, said directing means including;
  1. an opaque enclosure having a plurality of input light transmissive areas positioned to receive light from said light sources and a plurality of output light transmissive areas positioned to transfer to said light sensing means, and
  2. a plurality of light conducting elements disposed within said enclosure for guiding light from said input areas to said output areas in accordance with said second code, one of said input areas being coupled to more than one of said elements;
 holding means disposed between said light sources and said directing means for holding said medium; and
 means for energizing said light sources in a predetermined sequence such that said information will be read as electrical indications encoded according to said second code from said plurality of light sensing means.

2. Apparatus as defined in claim 1 wherein said light directing enclosure is encapsulated with a supporting material.

3. Apparatus as defined in claim 1 wherein said light conducting elements are fiber optic conductors.

4. Apparatus as defined in claim 1 wherein said means for sequentially energizing said light sources comprises:
 a power source;
 counting means for sequentially presenting a signal at a plurality of output lines;
 logic means responsive to the signal of said counting means for sequentially connecting said power source to said light sources.

5. Apparatus as defined in claim 1
 wherein said information pattern comprises a row and column arrangement of said opaque and light transmissive areas;
 wherein said input areas are arranged in rows and columns; and
 wherein different ones of said light sensing means are associated with different ones of said output areas to provide said electrical indications according to said second code.

6. Apparatus as defined in claim 5 wherein said plurality of light sources are aligned in rows corresponding to the rows of said input areas.

7. Apparatus as defined in claim 6 wherein said plurality of light sources are integral in rows on a nonconducting board such that said light sources are contained on that side of said board which is directly adjacent to said holding means.

8. Apparatus as defined in claim 7 wherein a solid planar conductor is secured to that side of said nonconducting board opposite said light sources.

9. Apparatus as defined in claim 7 wherein a planar conductor containing apertures corresponding to said data indications is secured to that side of said nonconducting board which contains said light sources.

10. Apparatus as defined in claim 9 wherein each of said light sources is an electroluminescent panel.

11. Apparatus as defined in claim 5 wherein only one of said light conducting elements is fixedly secured to any one of said input areas and wherein a plurality of light conducting elements corresponding to the number of area rows is fixedly secured to each of said output areas.

12. Apparatus as defined in claim 5 wherein said light conducting elements are connected to each input area of said rows and columns, and wherein said light conducting elements connected to each input area of any one column are connected together at that output area corresponding to said one column.

13. Apparatus as defined in claim 5 including means for indicating that said information medium to be read is fully inserted in said holding means, said means for indicating comprising:

a light source in registration with the most bottom position and on one side of said holding means; and a light sensing means in optical registration with said light source and on the other side of said holding means whereby the interruption of the light path between said light source and said light sensing means indicates full insertion of said medium.

14. Apparatus as defined in claim 5 wherein said light conducting elements connected to each input area of anyone column are connected together at that output area corresponding to said one column.

15. The combination comprising.

a nonconductive board having a plurality of spaced apart and parallel elongated electroluminescent panels mounted on one side thereof;

a solid planar conductor secured to that side of said nonconducting board opposite said panels;

an opaque light directing enclosure having a row and column arrangement of input light transmission areas and a plurality of output light transmissive areas;

a plurality of light sensors;

a reading station including means for mounting said enclosure, sensors and board such that said rows of light transmissive areas are positioned to receive light from different ones of said panels and such that said light sensors are positioned to receive light from said output areas; and a plurality of light conducting elements disposed within said enclosure for guiding light from said input areas to said output areas.

16. Apparatus as defined in claim 15 wherein a planar conductor containing apertures corresponding to said row and column arrangement is secured to that side of said nonconducting board which contains said panels.